Figure 4:
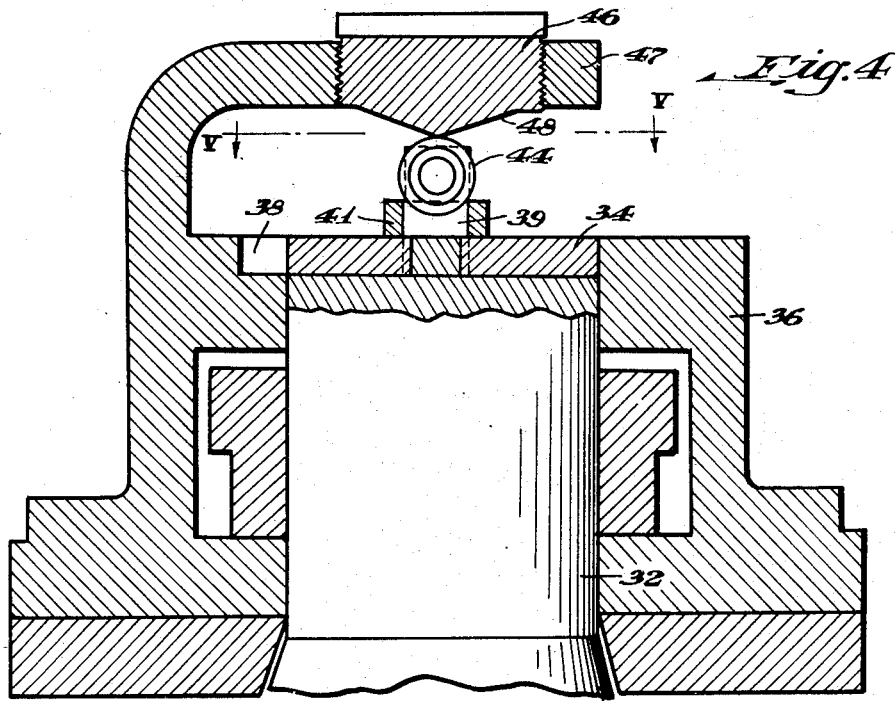

Jan. 3, 1939.  C. W. ANDERSON  2,142,550
PLUG VALVE
Filed Sept. 14, 1937  3 Sheets-Sheet 1
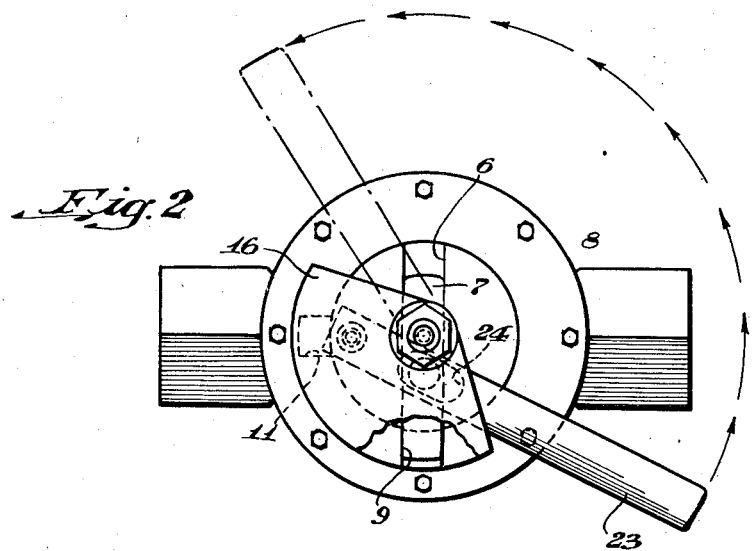
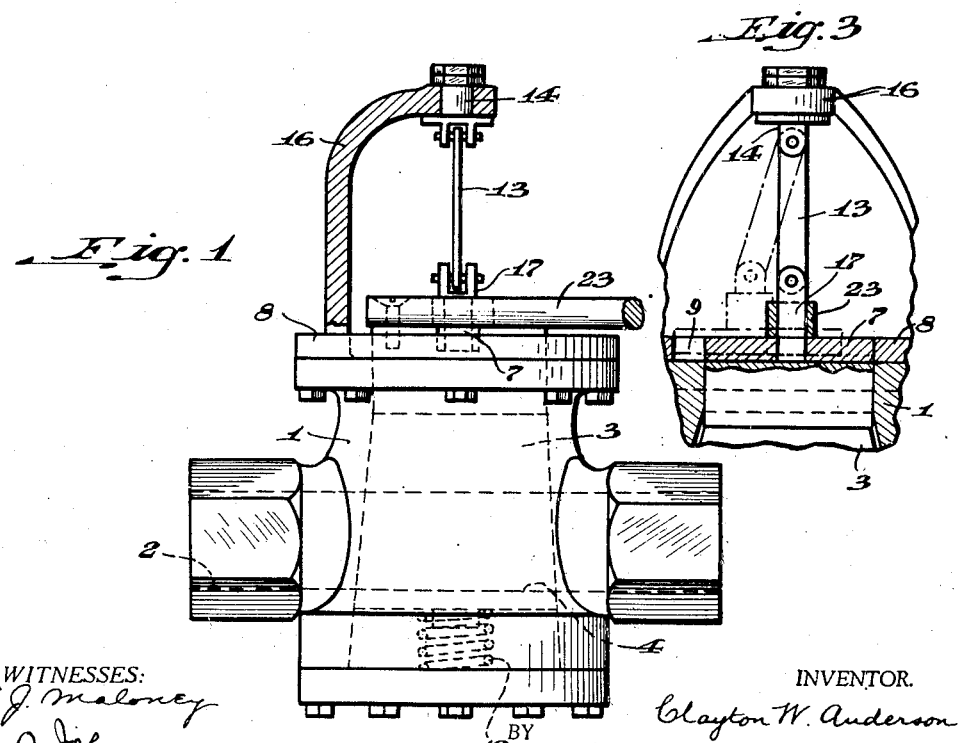
WITNESSES:
E. J. Maloney
E. O. Johns
INVENTOR.
Clayton W. Anderson
BY Brown, Critchlow & Flick
his ATTORNEYS.

Jan. 3, 1939.     C. W. ANDERSON     2,142,550

PLUG VALVE

Filed Sept. 14, 1937     3 Sheets-Sheet 2

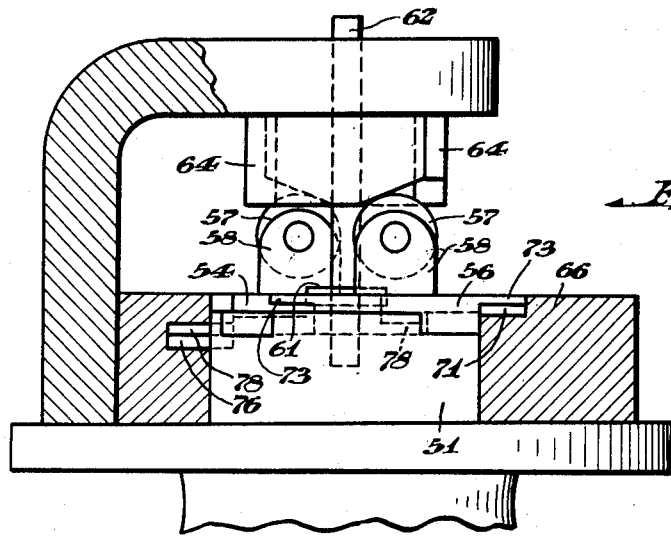
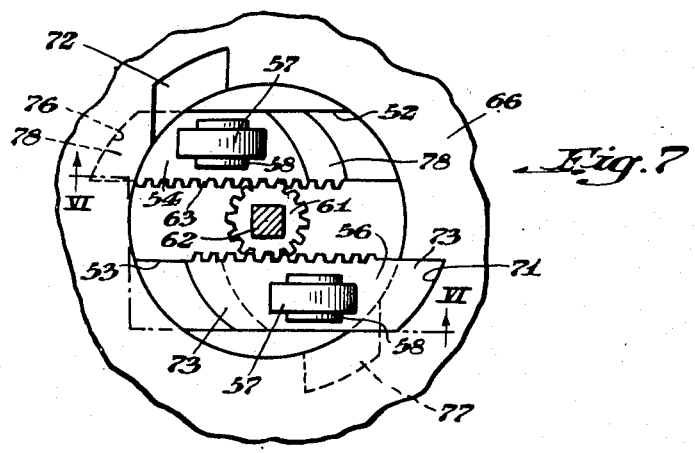
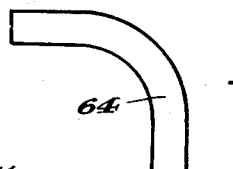

Patented Jan. 3, 1939

2,142,550

UNITED STATES PATENT OFFICE 2,142,550

PLUG VALVE

Clayton W. Anderson, Pittsburgh, Pa.

Application September 14, 1937, Serial No. 163,772

15 Claims. (Cl. 251—97)

This invention relates to plug valves, and more particularly to plug valves in which a tapered or conical plug is moved axially from its seat before it is rotated.

When the tapered plug of a plug valve is seated against its tapered seat it is generally wedged in place by the pressure of the fluid in the line and it sometimes corrodes there. It therefore would require a relatively large force to turn the plug against its seat, and such action would grind the adjoining surfaces together and cause rapid wear of both the plug and seat. Consequently, it is common practice to move the plug axially before rotating it in order to unseat it and leave it free to be rotated to the desired position by the application of only a small amount of force. Various means have been proposed and used for moving plug valves axially before and after rotating them, but in general these means have been complicated and expensive.

It is among the objects of this invention to provide a plug valve having relatively simple and inexpensive, but strong and dependable, means for moving the plug axially from its seat prior to rotating it from open or closed positions. Another object is to provide means whereby the plug is readily and quickly unseated, rotated, and seated again by continuous movement of the same operating means in the same direction.

Accordingly, a tapered plug member is mounted in a valve casing for rotary and axial movement, and another member is spaced from the smaller end of the plug and normally held against movement axially of the plug. A slide element is associated with one of these members for movement transversely thereof and for rotation therewith. Operating means is provided for rotating the slide within a predetermined arcuate path when it is in neutral position, by which is meant a position in which it can be rotated without first moving it radially of its path of rotation. The slide is adapted to be moved radially outwardly from neutral position when one of its ends is positioned at either end of its path of rotation. When the slide is moved inwardly to neutral position prior to being rotated, means engaging the slide and the member spaced therefrom forces them apart and thereby moves the plug axially off its seat. As previously indicated, rotation is imparted to the plug through the medium of the slide element, and this may be done by connecting the slide directly or indirectly to the plug. Either a toggle link or a cam serves to unseat the plug when the slide is moved radially of the plug into neutral position.

Figure 5:
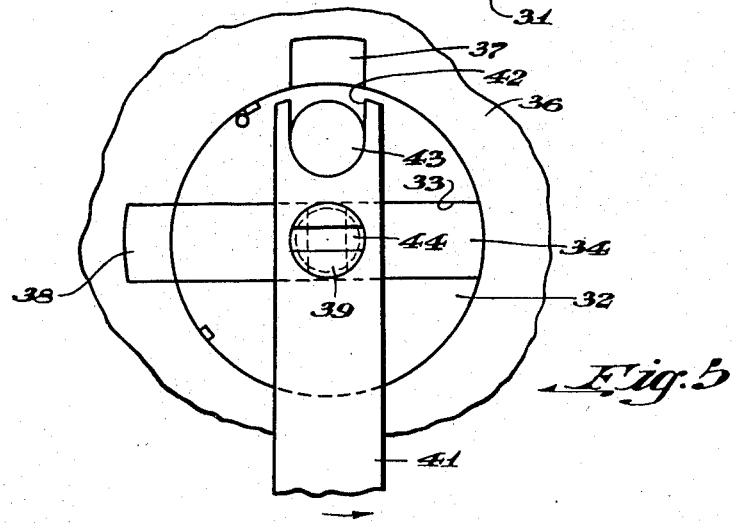

The invention is illustrated in the accompanying drawings, in which Fig. 1 is a side view of one embodiment partly broken away to more clearly show the plug actuating mechanism; Fig. 2 is a plan view of the valve while the plug is seated; Fig. 3 is a fragmentary view of the valve showing the slide element in longitudinal vertical section in neutral or plug-unseating position; Fig. 4 is a fragmentary vertical section through a modification of this invention with the plug unseated; Fig. 5 is a fragmentary plan view taken on the line V—V of Fig. 4; Figs. 6 and 7 are views corresponding to Figs. 4 and 5 of another embodiment, but with the plug seated; and Fig. 8 is a plan view of the outline of one of the cams used with this last embodiment.

Referring to the first three figures of the drawings, a valve casing 1 is provided with the usual passage 2 in which there is an upwardly tapered plug member 3 provided with a transverse passage 4. The top or smaller end of the plug is cylindrical and is provided across its top with a guideway 6 in which a slide element 7 is adapted to be moved radially of the plug. As shown in Fig. 2, the slide is prevented from moving radially outwardly relative to the top of the plug by annular plate 8 that is bolted to the top of the valve casing where it encircles both the plug and the slide except at predetermined points where the plate is provided with radial openings or slots 9 and 11 through which end portions of the slide can move when guideway 6 is aligned therewith. The normal position for the slide is with one of its ends in one of these slots, as shown in Fig. 2. When in such position plug 3 is held up against its seat by the pressure of fluid in the valve casing or by a spring 12, and is connected by a single inclined toggle link 13, shown in broken lines in Fig. 3, to the bifurcated lower end of a pin 14 rotatably mounted in a housing segment 16 integral with plate 8 and projecting over the center of the plug. The lower end of the link is likewise pivoted on a transverse axis to the bifurcated upper end of a pin 17 mounted in the center of slide 7.

To move the plug axially from its seat before turning it, the slide is moved inwardly of the plug top and out of slot 9, whereby link 13 is brought substantially into axial alignment with the plug which it therefore pushes off its seat, see Fig. 3. This position of the slide is referred to herein as its neutral position that permits it to be rotated because neither end of the slide is projecting into one of the slots in plate 8. It will be apparent that if the slide is rotated while in neutral position, it will transmit the rotation to the plug which is easily turned because it is off its seat. Plate slots 9 and 11 are preferably located 90° apart in such position that when one end of the slide projects into one of them the passage through the plug is at right angles to the passage through the valve casing, and when the opposite end of the slide projects into the other slot passages 2 and 4 are aligned.

To move the slide into and out of the plate slots, and also to rotate it, a lever 23 is pivoted to the top of the plug at the side of the slide nearest both of the slots, and is provided with a longitudinal slot 24 through which pin 17 projects. When the lever is swung on its pivot it first moves one end of the slide out of a plate slot and inwardly of guideway 6 until its opposite end strikes plate 8, then rotates the slide and plug in unison until the slide is aligned with the other plate slot, and then slides the adjacent end of the slide outwardly into that slot. To reverse this movement the lever is merely moved in the opposite direction. Rotation of the slide is arrested when it is aligned with either of the slots by any well known rotation-limiting means.

The valve as shown in Figs. 1 and 2 is in open position with the slide projecting into plate slot 9. In this position link 13 is inclined relative to the axis of the plug, and the plug is therefore seated. When the lever is swung in the direction of the arrow in Fig. 2 the slide is moved inwardly of guideway 6 until the inner end of the slide strikes plate 8. This movement of the slide straightens link 13 relative to the plug so that the plug is forced downwardly off its seat. As the lever can not move the slide lengthwise any farther, and as the slide has been withdrawn from the slot 9 so that it and the plug are free to rotate, the lever therefore rotates these two members until stopped by any suitable means. The plug passage is then at right angles to the valve casing passage, and the slide is in line with slot 11. As the slide can not be rotated farther in the same direction the lever moves the slide outwardly into slot 11. This movement of the slide again inclines link 13 relative to the plug so that the plug can be forced upwardly against its seat by spring 12 or by the fluid pressure in the valve casing. Consequently, by merely swinging the lever in one direction the valve plug is first unseated, then rotated, and then reseated. The same thing happens when the lever is swung in the opposite direction to return the plug to its first position.

It will thus be seen that by the simple movement and by relatively simple and inexpensive means the plug is moved axially from its seat before it is rotated from open or closed position.

In the embodiment shown in Figs. 4 and 5 the plug is unseated and turned in the same general manner as that just described, but the unseating is accomplished by cam means rather than by a toggle link. The small upper end of the plug 31 is provided with a cylindrical extension 32 across the upper end of which there is a guideway 33 in which a slide element 34 is adapted to be moved radially of the plug. The housing 36 that encircles the plug extension is provided at the proper locations, preferably 90° apart, with slots 37 and 38 each of which is adapted to receive one end of the slide.

When the slide is in its neutral position with one end engaging the encircling wall of the housing, a bifurcated pin 39 extends upwardly from the slide in axial alignment with the plug.

Pivoted on this pin is a lever 41 one end of which projects outwardly across the top of housing 36, and the other end of which projects nearly across the portion of the plug extension on the side of the slide nearest both slots. This shorter end of the lever is provided with a longitudinal recess 42 that receives a pin 43 connected to the top of the plug extension. The slide is shown in the drawings as being in neutral position, and by swinging the lever in the direction of the arrow in Fig. 5 the slide and plug will be rotated in unison because the slide can not move to the right in its guideway until it reaches housing slot 37.

To unseat the plug before it is rotated in either direction, a roller 44 is pivotally mounted in bifurcated pin 39 connected to the slide, and is adapted to bear against a cam 46 vertically adjustable in an arm 47 projecting over the plug extension and spaced therefrom, as shown in Fig. 4. This arm is preferably an integral part of housing 36. The cam surface 48 is so shaped that as the slide is moved outwardly from neutral or plug-unseating position and into either one of the slots 37 and 38, the plug is permitted to move upwardly toward and against its seat. For this purpose, the cam surface is preferably in the shape of an inverted cone the apex of which is in axial alignment with the plug.

The embodiment shown in Figs. 6 and 7 is similar to that shown in the two preceding figures, but includes a pair of slides, rollers and cams. The top of the plug extension 51 is therefore provided with a pair of spaced parallel guideways 52 and 53 in each of which there is a slide, 54 and 56, respectively, that carries a roller 57 pivoted in a bifurcated pin 58 connected to the underlying slide. These two slides are adapted to be moved outwardly and inwardly in opposite directions by means of a pinion 61 keyed on a vertical shaft 62 the lower end of which is journaled in the plug extension in axial alignment therewith. This pinion meshes with rack teeth 63 on the adjoining faces of the two slides which project above their guideways a short distance.

When these slides are simultaneously moved inwardly in opposite directions so as to carry their rollers into axial alignment with each other, each of the rollers rides against a cam 64, preferably of the general shape shown in Figs. 6 and 8, whereby the plug is forced axially down off its seat. When the slides reach neutral position and can move no farther in a straight line, further rotation of pinion 61 causes the slides and plug to rotate in unison therewith until one end of each slide reaches a slot in the housing 66 encircling the slides and plug extension. Continued rotation of the pinion then moves the slides outwardly in opposite directions and into these slots, and thereby allows the plug to rise to its seat again. This form of the invention is especially suitable for operation by a piston which can be easily connected with vertical shaft 62 by means of a rack and pinion or some similar connection.

To prevent the slides from trying to enter the wrong housing slots as the slides are being rotated with the plug, the slots for one slide are located at a different level than those for the other. As shown, slots 71 and 72 for receiving the ends of slide 56 are rather shallow and open at the top, and the ends of slide 56 are provided with upper tongues 73 adapted to enter these slots. Slots 76 and 77 for slide 54 are spaced from the top of housing 66, and the ends of slide 54 are provided with lower tongues 78 for entering these lower slots. Consequently, slide 56 can enter only the upper slots and slide 54 can enter only the lower slots.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A valve comprising a casing, a tapered plug member mounted therein for rotary and axial movement, an axially stationary member spaced from the smaller end of the plug, a slide element associated with one of said members for movement transversely thereof and for rotation therewith, operating means for rotating the slide within a predetermined arcuate path when it is in neutral position, said slide being movable outwardly from neutral position by continued forward movement of said operating means when one of the ends of the slide is positioned at either end of said path, and means engaging the slide and the other of said members for forcing them apart when the slide is moved to neutral position whereby to move the plug axially off its seat.

2. A valve comprising a casing, a tapered plug member mounted therein for rotary and axial movement, an axially stationary member spaced from the smaller end of the plug, one of said members being provided with a guideway extending radially thereacross, a slide element disposed in said guideway for movement longitudinally thereof and for rotation in unison with the adjoining member, operating means for rotating said slide-carrying member in opposite directions within a predetermined arcuate path when said slide is between the ends of said guideway, means projecting across the ends of said guideway except at the ends of said path whereby the slide is movable outwardly only at the ends of said path, and means engaging the slide and the other of said members for forcing them apart when the slide is moved in between the ends of the guideway to thereby unseat the plug.

3. A valve comprising a casing, a tapered plug member mounted therein for rotary and axial movement, a rotary member spaced from the smaller end of the plug, a slide element associated with one of said members for movement transversely thereof and for rotation therewith, a link pivoted at its ends to said slide and the other of said members, and operating means for rotating the slide in opposite directions within a predetermined arcuate path when it is in neutral position with said link extending substantially longitudinally of the plug, said slide being movable outwardly from neutral position when one of its ends is positioned at either end of said path whereby to incline the link relative to the plug axis.

4. A valve comprising a casing, a tapered plug mounted therein for rotary and axial movement, a rotary member spaced from the smaller end of the plug, a slide element associated with said end of the plug for movement transversely thereof and for rotation therewith, a link pivoted at its ends to the slide and rotary member, operating means for rotating said plug within a predetermined arcuate path, said slide being movable outwardly when the plug is at either end of said path to incline the link relative to the plug axis, means for holding the slide in neutral position with the link in axial alignment with the plug while the plug is being turned, and means connecting said operating means to the slide whereby to move it into neutral position before rotating said plug and out of neutral position after the plug has been rotated to the opposite end of said arcuate path.

5. A valve comprising a casing, a tapered plug mounted therein for rotary and axial movement, a rotary member spaced from the smaller end of the plug and coaxial therewith, a slide element associated with said plug end for movement radially thereof and for rotation therewith, a single link, said link being pivoted at its ends on transverse axes to the slide and rotary member, operating means for rotating said plug in opposite directions within a predetermined arcuate path, said slide being movable outwardly when the plug is at either end of said path to incline the link relative to the plug axis, means for holding the slide in neutral position with the link in axial alignment with the plug while the plug is being turned, and means connecting said operating means to the slide whereby to move it into neutral position before rotating said plug and out of neutral position after the plug has been rotated to the opposite end of said arcuate path.

6. A valve comprising a casing, a tapered plug mounted therein for rotary and axial movement, a rotary member spaced from the smaller end of the plug and coaxial therewith, a slide element associated with said plug end for movement radially thereof and for rotation therewith, a single link, said link being pivoted at its ends on transverse axes to the slide and rotary member, operating means for rotating said plug in opposite directions within a predetermined arcuate path, annular means coaxial with the plug encircling said slide and provided at each end of said path with openings adapted to receive the end portions of the slide, and means connecting said operating means to the slide whereby to move it into one of said openings while said plug is at an end of said arcuate path.

7. A valve comprising a casing, a tapered plug mounted therein for rotary and axial movement, a rotary member spaced from the smaller end of the plug and coaxial therewith, a slide element associated with said plug end for movement radially thereof and for rotation therewith, a single link, said link being pivoted at one end of a transverse axis to the rotary member, a pin projecting from the outer face of the slide, the opposite end of the link being pivoted on a transverse axis to said pin, and a lever connected to said plug for rotating it in opposite directions within a predetermined arcuate path, said slide being movable outwardly when the plug is at either end of said path to incline the link relative to the plug axis, means for holding the slide in neutral position with the link in axial alignment with the plug while the plug is being turned, said lever being provided with an opening through which said pin projects whereby the lever moves the slide into neutral position before rotating said plug and out of neutral position after the plug has been rotated to the opposite end of said arcuate path.

8. A valve comprising a casing, a tapered plug mounted therein for rotary and axial movement, a rotary member spaced from the smaller end of the plug and coaxial therewith, a slide element associated with said plug end for movement radially thereof and for rotation therewith, a single link, said link being pivoted at one end of a transverse axis to the rotary member, a pin projecting from the outer face of the slide, the opposite end of the link being pivoted on a transverse axis to said pin, and a lever pivotally connected to the face of said end of the plug and extending across said slide, said lever being provided with a longitudinal slot receiving said pin, and means for holding the slide in neutral position with the link in axial alignment wth the plug axis whereby actuation of the lever rotates said plug and slide, said slide-holding means being provided at predetermined points with slide-receiving openings into which the lever moves the slide.

9. A valve comprising a casing, a tapered plug mounted therein for rotary and axial movement and having its smaller end provided with a guideway extending radially thereacross, a slide element disposed in said guideway for movement longitudinally thereof and for rotation with the plug, a rotary member spaced from said end of the plug, a link pivoted at its ends to said slide and rotary member, operating means for rotating said plug in a predetermined arcuate path when said slide is between the ends of said guideway with the link in substantially axial alignment with the plug, said slide being movable outwardly when the plug is at either end of said path to incline said link relative to the plug axis, and means connecting said operating means to the slide whereby to move it in between the ends of said guideway before rotating the plug.

10. The combination of a tapered valve plug and a seat therefor, of an axially stationary member spaced from one end of the plug, a link connected to said member, means for rotating the plug in opposite directions within a predetermined arc, said means comprising means connecting the free end of said link to said plug and slidable radially thereof for common rotation therewith while admitting of lateral movement of said end of the link, and means for first sliding said connecting means and then rotating said plug.

11. A valve comprising a casing, a tapered plug mounted therein for rotary and axial movement, a slide element associated with the smaller end of the pug for movement transversely thereof and for rotation therewith, operating means for rotating said plug within a predetermined arcuate path, said slide being movable outwardly when the plug is at either end of said path, means for holding the slide in neutral position while the plug is being turned, means connecting said operating means to the slide whereby to move it into neutral position before rotating the plug and out of neutral position after the plug has been rotated to the opposite end of said arcuate path, a cam spaced from the outer face of said slide and provided with a cam surface inclined inwardly from its edge toward said slide, and means mounted on said slide for engaging said cam surface to unseat the plug when the slide is moved inwardly to its neutral position.

12. A valve comprising a casing, a tapered plug mounted therein for rotary and axial movement, the smaller end of the plug being provided with a guideway extending radially thereacross, a slide element disposed in said guideway for movement longitudinally thereof and for rotation in unison with the plug, operating means for rotating said plug in a predetermined arcuate path when the slide is in neutral position between the ends of said guideway, means projecting across the ends of said guideway except at the ends of said path whereby the slide is movable outwardly only at the ends of said path, means connecting said operating means to the slide whereby to move it into neutral position before rotating the plug and out of neutral position after the plug has been rotated to the opposite end of said arcuate path, a cam spaced from the outer face of said slide and provided with a cam surface inclined inwardly from its edge toward said slide, and means mounted on said slide for engaging said cam surface to unseat the plug when the slide is moved inwardly to its neutral position.

13. A valve comprising a casing, a tapered plug mounted therein for rotary and axial movement, a pair of slide elements associated with the smaller end of the plug for movement transversely thereof in parallel lines and for rotation therewith, operating means for rotating the plug when the slides are in their neutral position and for moving the slides outwardly in opposite directions when the plug reaches either end of a predetermined path of rotation, means spaced from the outer faces of said slides and provided with cam surfaces inclined inwardly from their edges toward said slides, and means mounted on said slides for engaging said cam surfaces to unseat the plug when the slides are moved inwardly to their neutral position.

14. A valve comprising a casing, a tapered plug mounted therein for rotary and axial movement, a pair of slide elements associated with the smaller end of the plug for movement transversely thereof in parallel lines and for rotation therewith, the opposed faces of the slide being provided with rack teeth, a pinion journaled between said teeth and meshing therewith, operating means for turning the pinion, means for holding the slides in longitudinally stationary position when they are in neutral position whereby said pinion rotates the plug when the slides are in neutral position and moves them outwardly in opposite directions when the plug reaches either end of a predetermined path of rotation, means spaced from the outer faces of said slides and provided with cam surfaces inclined inwardly from their edges toward said slides, and means mounted on said slides for engaging said cam surfaces to unseat the plug when the slides are moved inwardly to their neutral position.

15. A valve comprising a casing, a tapered plug member mounted therein for rotary and axial movement, an axially stationary member connected to said casing and spaced from one end of the plug, a slide element associated with one of said members for movement transversely thereof and for rotation therewith, means connected to the slide element and the other of said members whereby the plug is moved axially off its seat when the slide is moved to a predetermined position, and operating means for rotating the slide within a predetermined arcuate path when it is in said predetermined plug-unseating position, said slide being movable transversely of the plug from said position by continued forward movement of said operating means when one of the ends of the slide is positioned at either end of said arcuate path.

CLAYTON W. ANDERSON.